United States Patent
Goldburg (10) Patent No.: US 7,386,043 B2
(45) Date of Patent: Jun. 10, 2008

(54) METHOD AND APPARATUS FOR INCREASING SPECTRAL EFFICIENCY USING MITIGATED TRANSMIT POWER NEAR BAND-EDGE

(75) Inventor: Marc Goldburg, Redwood City, CA (US)

(73) Assignee: ArrayComm LLC, San Jose, CA (US)

( * ) Notice: Subject to any disclaimer, the term of this patent is extended or adjusted under 35 U.S.C. 154(b) by 0 days.

(21) Appl. No.: 11/598,133

(22) Filed: Nov. 8, 2006

(65) Prior Publication Data

US 2007/0053418 A1 Mar. 8, 2007

Related U.S. Application Data

(63) Continuation of application No. 10/036,779, filed on Dec. 31, 2001, now Pat. No. 7,151,795.

(51) Int. Cl.
*H04B 17/00* (2006.01)
*H04Q 7/00* (2006.01)

(52) U.S. Cl. ............ 375/227; 455/522; 455/67.11

(58) Field of Classification Search ........ 375/225, 375/227, 259, 260, 297; 455/517, 522, 67.11
See application file for complete search history.

(56) References Cited

U.S. PATENT DOCUMENTS

| | | | |
|---|---|---|---|
| 5,592,490 | A | 1/1997 | Barratt et al. |
| 5,625,880 | A | 4/1997 | Goldburg et al. |
| 5,828,658 | A | 10/1998 | Ottersten et al. |
| 6,154,661 | A | 11/2000 | Goldburg |
| 6,185,440 | B1 | 2/2001 | Barratt et al. |
| 6,463,295 | B1 | 10/2002 | Yun |
| 6,675,020 | B2 | 1/2004 | Sawyer |
| 6,687,238 | B1 | 2/2004 | Soong et al. |
| 6,731,705 | B2 | 5/2004 | Kasapi et al. |

(Continued)

OTHER PUBLICATIONS

TS 25.214 V1.0.0 (Apr. 1999), UTRA FDD; Physical layer procedures, 31 pages.

(Continued)

*Primary Examiner*—Young T. Tse
(74) *Attorney, Agent, or Firm*—Blakely, Sokoloff, Taylor & Zafman LLP (57) ABSTRACT

A method and apparatus for increasing the spectral efficiency of communications systems by employing portions of the spectrum, which portions might otherwise be reserved as all or part of guard bands and not utilized (i.e., effectively wasted), for communicating at reduced power levels between devices that are determined to experience relatively high performance (e.g., relatively little path loss, etc.). In a communication system having a first predefined maximum system transmission power level for in-band transmissions, a method is provided for determining that communication performance between a first communication device and a second communication device exceeds a performance threshold. Based on the determination, a first band-edge channel for communication between the first communication device and the second communication device (i.e., transmission from the first device to the second device and/or visa versa) is assigned. Finally, the first communication device and/or the second communication device utilize one or more band-edge channels (each may use a different band-edge channel) for transmitting a relatively reduced power level.

25 Claims, 4 Drawing Sheets

U.S. PATENT DOCUMENTS

6,741,837 B1   5/2004   Nakano et al.
7,003,310 B1   2/2006   Youssefmir et al.
7,016,429 B1   3/2006   Dogan et al.
7,151,795 B1 * 12/2006   Goldburg .................... 375/227

OTHER PUBLICATIONS

802.16e™, Part 16: Air Interface for Fixed and Mobile Broadband Wireless Access Statements, Feb. 28, 2006, Sections 6, 7, and 8, pp. 17-650. See in particular subchapters 6.1, 6A, 7.1, 7.2, 8.4 and 8.4.8.

* cited by examiner

METHOD AND APPARATUS FOR INCREASING SPECTRAL EFFICIENCY USING MITIGATED TRANSMIT POWER NEAR BAND-EDGE

The present application is a continuation of U.S. patent application Ser. No. 10/036,779 filed Dec. 31, 2001, now U.S. Pat. No. 7,151,795 entitled "METHOD AND APPARATUS FOR INCREASING SPECTRAL EFFICIENCY USING MITIGATED POWER NEAR BAND-EDGE". The U.S. patent application Ser. No. 10/036,779 is hereby incorporated herein by reference.

FIELD OF THE INVENTION

The present invention relates to the field of wired and wireless communications, and in particular, to methods and systems for increasing spectral efficiency in voice and/or data communications systems.

BACKGROUND OF THE INVENTION

Because the electromagnetic spectrum is a limited resource, a number of regulatory and technical limitations constrain its utilization in wireless applications, such as communications. Regulatory agencies, such as the Federal Communications Commission (FCC), typically allocate finite slices or bands of the spectrum for various wireless uses, geographic areas, transmission power, and particular operators. (Although this disclosure primarily refers to wireless systems, the descriptions herein may be equally applicable to wired systems, such as those that utilize frequency division multiple access (FDMA).) Also, because certain types of wireless spectrum applications/uses practically operate in a limited range of frequencies, the amount of usable spectrum may even further be constrained by the technical requirements and limitations of a particular application or system architecture. Finally, emerging voice and especially data services generally require increased bandwidth over past services, thereby further increasing the demand for spectrum. As a result of such regulatory and technical constraints on spectral use, as well as the increasing demand for spectrum for wireless services, spectrum allocations are increasingly scarce and expensive. Therefore, there is growing need for methods and systems for increasing the efficient use of such spectrum allocations.

Unfortunately, it is virtually impossible to design practical transmitting devices that completely restrict their transmissions to some assigned band. Transmissions in one band (referred to herein as in-band transmissions) invariably cause some energy to be transmitted into other, especially adjacent, bands (referred to herein as out-of-band transmissions), potentially causing interference to communications in those bands. For this reason, regulatory and technical limits are typically imposed on the maximum allowable power level for transmissions that are out-of-band. ("Band" as used herein refers to one or more contiguous frequency blocks) For this and other reasons, most systems and/or regulations impose not only a predefined maximum power level for in-band transmissions, but also impose a predefined maximum power level for out-of-band transmissions, the latter of which is typically far less than the former, and ideally (but not necessarily in practice) zero. Although these in-band and out-of-band power limits are specified independently, as a practical matter, reductions in in-band transmission levels generally reduce the level of out-of-band transmissions as well.

In some circumstances, for example, as relating to common regulations for cellular voice and/or data systems, predefined maximum power levels for in-band and out-of-band transmissions may further be distinguished for uplink versus downlink transmissions, as shown below in Table 1:

TABLE 1

|  | In-Band Max. Power | Out-of-Band Max. Power |
|---|---|---|
| Downlink Transmission | $P_{D-I}$ | $P_{D-O}$ |
| Uplink Transmission | $P_{U-I}$ | $P_{U-O}$ |

As Table 1 shows, there may be a predefined in-band maximum power levels for downlink transmissions, $P_{D-I}$, a predefined in-band maximum power level for uplink transmissions, $P_{U-I}$, a predefined out-of-band maximum power level for downlink transmissions, $P_{D-O}$, and finally a predefined out-of-band maximum power level for uplink transmissions, $P_{U-O}$. It should be appreciated that, depending on various system architectures, regulations and other factors, all or a combination of these quantities may be equal or unequal. It should also be noted that, depending on the intended use of the communications system and a regulatory body's use of terminology, the downlink transmission power limits can be phrased instead as limits on "fixed" transmitters (e.g., base stations) while the uplink transmission power limits are phrased instead as limits on "mobile" or "portable" transmitters (e.g., cellular telephones or other remote terminals).

It is common for regulatory bodies and system designers to employ a band allocation scheme that reduces the risk for such adjacent-band interference. For example, in a cellular communication system, two cellular sites that are in close geographical proximity are typically allocated non-adjacent bands to reduce the possibility that the out-of-band transmissions originating from one cell will affect communications in the other cells using an adjacent band (the level of out-of-band transmissions from a transmitting device generally decay with the frequency separation from the device's nominal operating band). Similar non-adjacent allocation of bands for communication devices in geographic proximity are utilized in various other types of wireless applications as well.

Because geographic separation of adjacent-band devices is not always practical or effective by itself to prevent inter-band interference, other techniques sometimes are employed to reduce the effect of out-of-band transmissions and resultant inter-band interference. For example, a transmitter is typically equipped with power amplifier filters to reduce out-of-band transmissions. However, in the case of transmit filtering, even the most complex and expensive filters are not ideal in allowing full power in-band transmission, while completely eliminating out-of-band transmissions. In fact, most practical filter designs suffer from insertion loss (i.e., decreased or irregular power delivery for in-band transmission) and/or some level of out-of-band transmission. Unfortunately, as transmit filters are designed to decrease the insertion loss, the amount of out-of-band transmission is typically increased and/or the filter design becomes expensive. While filters at a receiver can be effective in reducing the effects of powerful out-of-band signals (relative to the receiver's operating band), they can not be used to mitigate interfering signals that fall within the receiver's operating band. Hence the mitigation of interference falling within a receiver's operating band are primarily achieved through the removal of the interfering device in frequency and space, and reductions in the amount of interference that it produces.

A common recourse, often employed in conjunction with transmitter filtering, for mitigating out-of-band transmissions (e.g., to ensure compliance with out-of-band transmitted power limits imposed in some circumstances) is to provide "guard bands" between adjacent spectral bands. This technique is described with reference to FIGS. 1A and 1B.

Figure 1A:
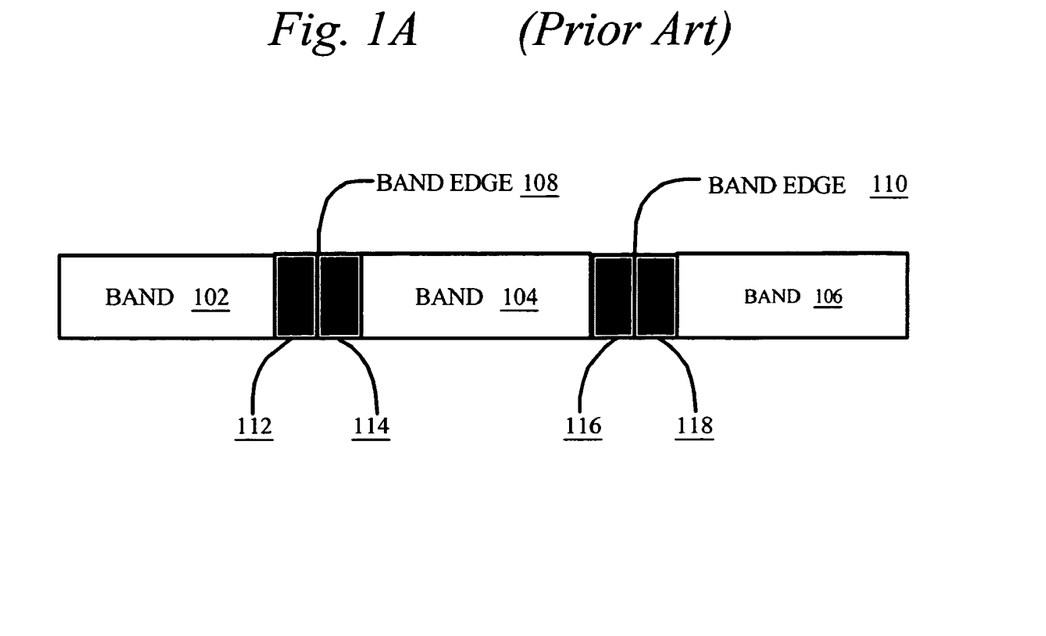
FIG. 1A illustrates the provisioning of adjacent bands using guard bands, in accordance with the prior art.

FIG. 1A illustrates the provisioning of adjacent bands using guard bands, in accordance with the prior art. For illustrative purposes, three bands 102, 104 and 106 are depicted. Each band represents, for example, a contiguous frequency block that facilitates one or more channels that may be available to a particular device or system. A "channel" as used herein refers to any one or combination of conventional communication channels, such as frequency, time or code. For example, band 102 may facilitate channels that a first cellular base station employs for communicating with one or more terminals within its cell, while band 104 may facilitate channels that a second base station that is adjacent to the first base station may employ for communicating with terminals within its cell. Of course, each band may facilitate one or more channels used for communication in a peer-to-peer system.

The bands 102 and 104 border at band edge 108, and similarly, the bands 104 and 106 border at band edge 110. Reference numerals 112, 114, 116, and 118 represent reserved band-edge guards or simply, guard bands, representing portions of bands that, because of their proximity to another band, are not utilized for transmissions in order to prevent adjacent-band interference—that is, out-of-band transmissions affecting users within a band and in-band transmissions affecting users of other bands. The guard band 112, for instance, represents a frequency band within band 102 that is adjacent to band 104 and is therefore reserved; that is, one or more devices that utilize band 102 or a portion thereof are restricted from using one or more channels in guard band 112 in order to prevent interference with devices operating in the adjacent band 104 and also to further minimize the likelihood of significant interference from band 104 devices to band 102 devices. In turn, band 104 includes a guard band 114, which is adjacent to band 102 and is therefore reserved; that is, devices operating in band 104 are restricted from utilizing any channel(s) in guard band 114 for transmission in order to prevent interference with devices operating band 102 and also to further minimize the likelihood of significant interference from band 102 devices to band 104 devices. Similarly, band 104 has a guard band 116 adjacent to band 106, and band 106, in turn, has a guard band 118 adjacent to band 104, to prevent adjacent-band interference between the bands 104 and 106.

Figure 1B:
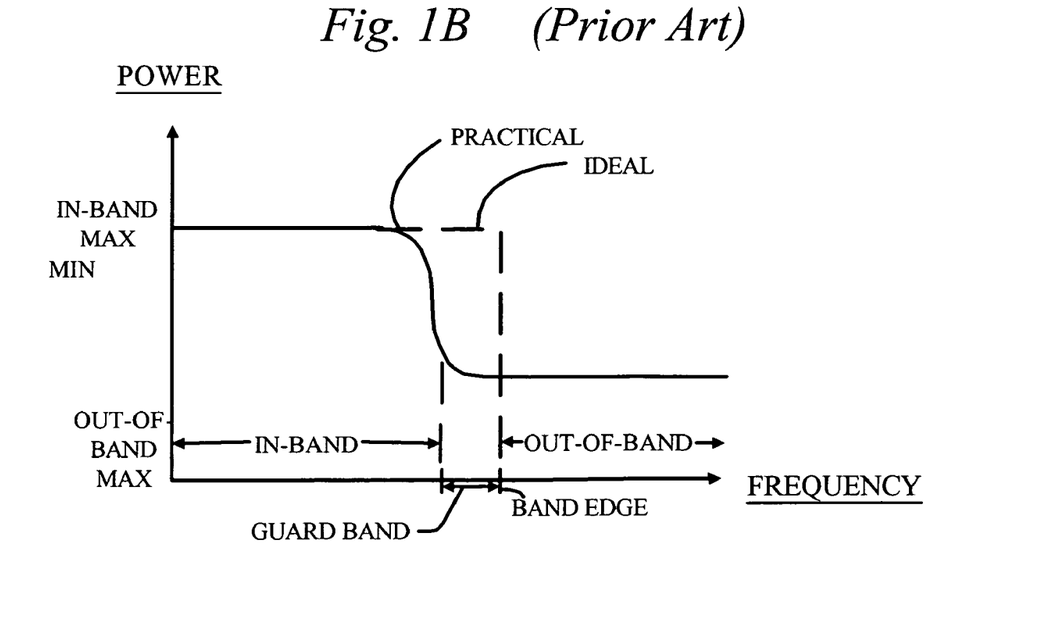
FIG. 1B is a graph depicting transmitted power as a function of frequency for in-band and out-of-band transmissions, in accordance with the prior art.

FIG. 1B is a graph depicting transmitted power as a function of frequency for in-band and out-of-band transmissions, in accordance with the prior art. As shown, an ideal filter design would provide maximum allowable (as typically defined by a particular system's or regulation's limits) transmit power delivery for in-band transmissions up to a band edge, and provide zero power out-of-band. However, using conventional filter designs that do not provide ideal vertical edge cut-off, systems usually allow some maximum out-of-band power to be transmitted, as shown in FIG. 1B.

In part because of these non-ideal characteristics of filters, as also depicted in FIG. 1B, guard bands are typically included to prevent the effects of out-of-band interference, and the greater the amount and size of the guard bands, typically, the less interference is experienced between bands. On the other hand, because guard bands are essentially not utilized for communication, their use also results in an inefficient utilization of spectrum.

Thus, what is a desired is a method and apparatus for mitigating inter-band interference while improving spectral efficiency over prior art methods.

SUMMARY OF THE INVENTION

A method and apparatus is provided for increasing the spectral efficiency of communications systems by employing portions of the spectrum, which portions might otherwise be reserved as part or all of guard bands and not utilized (i.e., effectively wasted), for communicating at reduced power levels between devices that are determined to experience relatively high performance (e.g., relatively little path loss, etc.). In a communication system having a first predefined maximum system transmission power level for in-band transmissions, a method is provided for determining that communication performance between a first communication device and a second communication device exceeds a performance threshold. Based on the determination, a first band-edge channel for communication between the first communication device and the second communication device (i.e., transmission from the first device to the second device and/or visa versa) is assigned. Finally, the first communication device and/or the second communication device utilize one or more band-edge channels (each may use a different band-edge channel) for transmitting a relatively reduced power level.

DETAILED DESCRIPTION

The present invention provides a method and apparatus for improving spectral efficiency while mitigating the effects of inter-band interference by allowing reduced power transmission to take place near the band edge (i.e., in a band-edge channel). In accordance with one aspect of the invention, transmission power is reduced near a band edge relative to transmission power further from the band edge. In accordance with another aspect of the invention, two or more devices in communication with each other and which experience performance above a threshold (as measured by one or both of the devices) will be assigned a (in-band) band-edge channel in which to transmit at relatively reduced power relative to two or more communication devices that experience performance below the threshold (or another threshold). In the latter instance, those devices that experience relatively worse performance will utilize relatively greater transmit power in one or more (in-band) non-band-edge channels that are farther from the band edge. As used herein, a "band-edge channel" refers to a portion of a band that is in relative close proximity to the band edge. For example, in systems employing guard bands, a band-edge channel refers to at least one or more channels adjacent to, or second-adjacent to, or within the (in-band) guard band.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

It should be appreciated that the present invention is not limited to any particular communication system, device(s), or architectures, but rather, the invention may find use in various types of communication systems where frequency bands are allocated in such a way that transmission in adjacent bands may cause inter-band interference. Accordingly, the terms "remote terminal" or "remote terminal unit" are used interchangeably herein and broadly to refer to various devices that may be employed, for example, in point-to-multipoint or peer-to-peer devices, including, but not limited to, cellular handsets, microwave point-to-multipoint subscriber units, WLAN modems, PCMCIA modems, etc., to provide wireless voice and/or data communications. Similarly, the terms "communication station" or "base station" as used in this description broadly refer to various types of devices or systems that serve or route data for a number of terminal units, including, but not limited to, cellular base stations, WLAN access points, microwave point-to-multipoint stations, etc. A "terminal" or "terminal unit" is used broadly herein to mean any fixed or portable communication device that may receive and/or transmit communication voice and/or data signals (e.g., a remote terminal, a base station, other communication device, etc.).

Finally, it should be appreciated that the invention is not limited to a particular type of signal transmission, and may be employed in a variety of wireless or wired systems that might otherwise suffer from spectral inefficiency due to the use of guard bands. The invention may be employed in systems where there is exchange of voice, data, or voice and data signals. Furthermore, the invention may be employed in various communications architectures and air (or wired) interfaces, including, but not limited to, TDMA, CDMA, FDMA, W-CDMA, 802.11, 802.16, and/or other signal interface standards for voice and/or data transmission.

Figure 2:
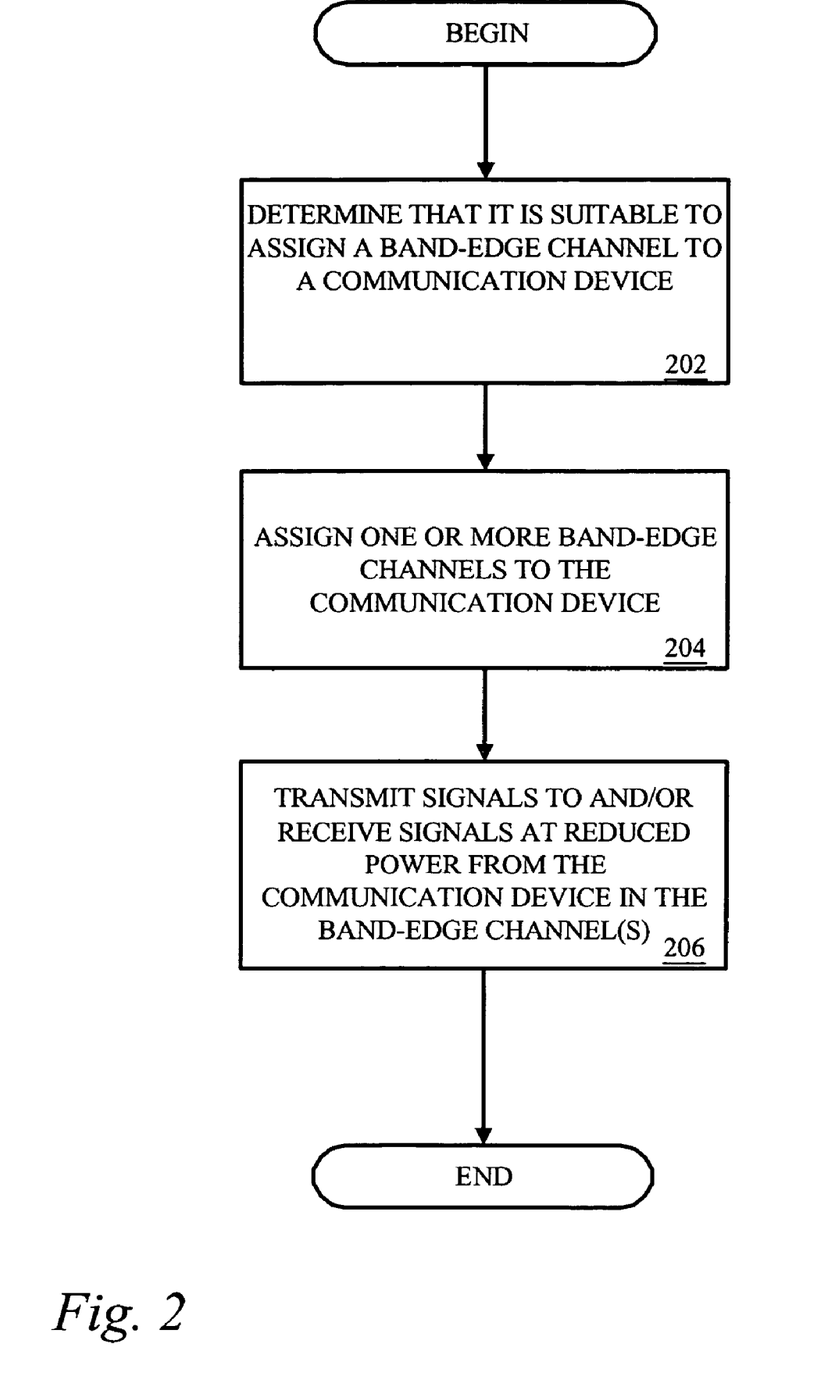
FIG. 2 is a flow diagram of a method for utilizing band-edge channels for transmission, in accordance with one embodiment of the invention.

FIG. 2 is a flow diagram of a method for utilizing band-edge channels for transmission, in accordance with one embodiment of the invention.

At block 202, a communication device determines that it is suitable to assign a band-edge channel to a communication device, such as a terminal unit, base station or other communication device. In one embodiment, the device making such determination is a base station serving a remote terminal. In an alternative embodiment, for example as may be embodied in a peer-to-peer network, a terminal makes the determination, and may either begin transmitting in the band-edge channel, or it may transmit a request to another device, such as another terminal, to use a band-edge channel. In yet another embodiment, a base station and a terminal device may cooperatively determine to utilize a band-edge channel (e.g. both devices may include, in one embodiment, channel assignment, power control, and/or performance measurement circuitry/logic, to perform one or more of the methods described herein separately or cooperatively). Thus, one or more devices may make such determination and/or perform one or more of the steps described herein in various embodiments of the invention as implemented in base station-to-terminal or peer-to-peer networks.

In one embodiment, a predefined maximum transmission power level is provided for in-band uplink transmissions, out-of-band uplink transmissions, in-band downlink transmissions, and out-of-band downlink transmissions (e.g., as shown in Table 1 and described in connection thereto above). Depending on the particular system constraints (e.g., a particular FCC regulation) two or more of these four power level thresholds may be, but are not necessarily, equal in certain implementations. Of course, the terminology "uplink" and "downlink" may not apply to certain embodiments of the invention, for example, in point-to-point/peer-to-peer implementations.

At block 204, one or more band-edge channels are assigned to (and/or by) the communication device. In an FDD implementation, for example, two or more band-edge channels may be assigned—one for transmission from the communication device and one for transmission (by another device) to the communication device. In a TDD implementation, on the other hand, the same band-edge channel may be utilized for transmission and reception by the communication device.

At block 206, the communication device, using the band-edge channel, transmits and/or receives a signal transmitted to it at a reduced power level. In one embodiment, a band-edge channel is utilized for reduced power uplink transmission whose transmission is below a predefined maximum power level for in-band uplink transmissions. In one embodiment, a band-edge channel is utilized for reduced power downlink transmission whose transmission power is below a predefined maximum power level for in-band downlink transmissions.

The invention may be utilized in time division duplex (TDD) or frequency division duplex (FDD) systems. Therefore, it should be appreciated that uplink and downlink transmissions, in a TDD implementation, may occur on the same band-edge channel while uplink and downlink transmissions, in a FDD implementation, may each occur on a distinct channel, one or both of which may be band-edge channels.

In one embodiment, there two predefined maximum power level limits associated with communicating with the communication device: first, a predefined maximum power level for transmitting to the communication device; and second, a predefined maximum power level at which the communication device transmits to another device, such as a base station, other communication device, etc. In one embodiment, the first predefined maximum power level exceeds the second predefined maximum power level. In this embodiment, the communication device transmits below the second predefined power level, while the other device, in one embodiment a base station, transmits to the communication device below the first predefined power level.

In one embodiment, transmissions from a first device to a second device occur in the same band-edge channel as transmissions from the second device to the first device, once both devices are utilize the same. For example, in a TDD implementation of the invention, such may be the case. In an alternative embodiment, for example as implemented in a FDD system, transmissions from the first device to the second device occur on a first band-edge channel, while transmissions from the second device to the first device occur on a second band-edge channel.

Figure 3:
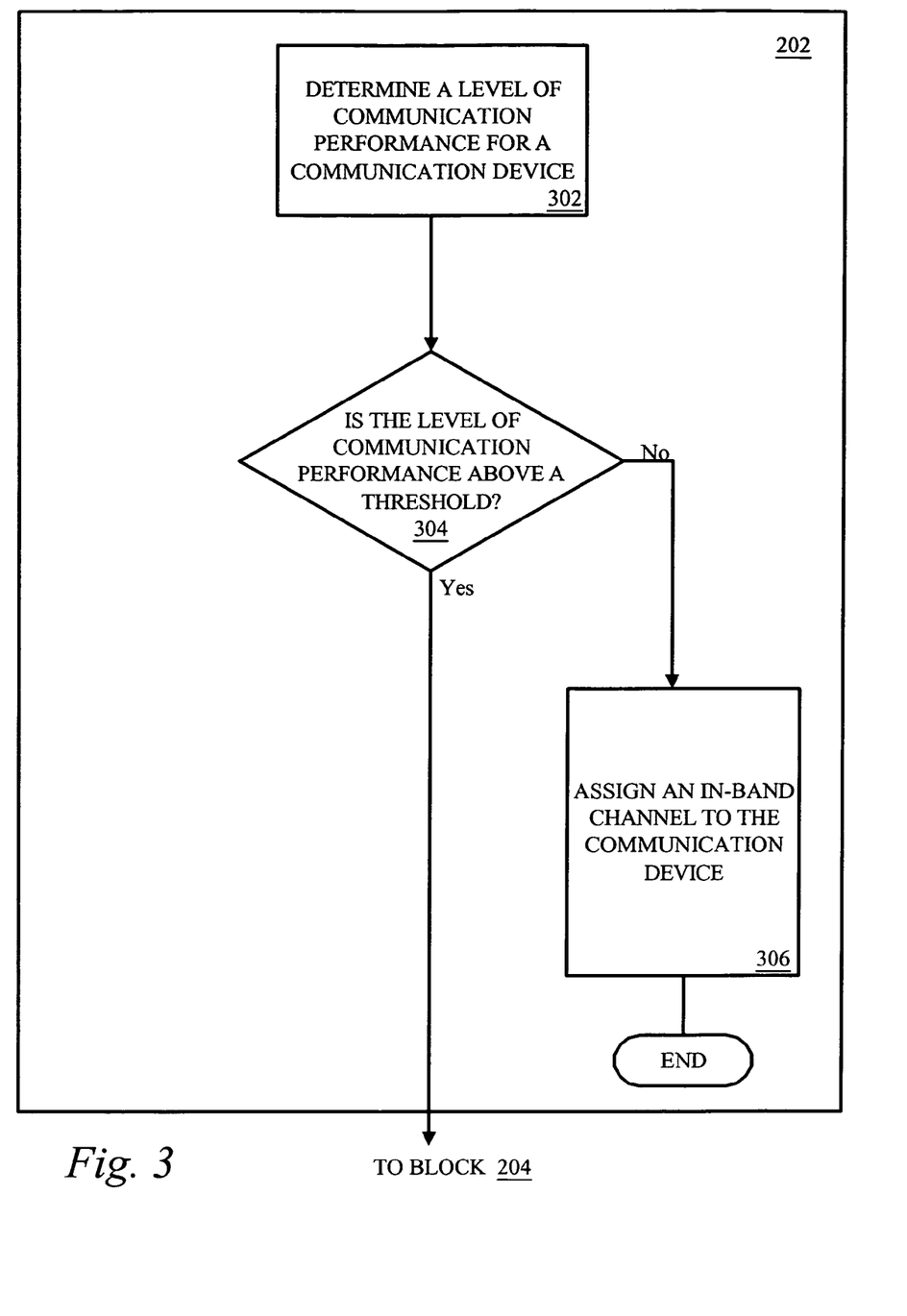
FIG. 3 is a flow diagram of a method for determining whether to assign/use a band-edge channel, in accordance with one embodiment of the invention.

FIG. 3 is a flow diagram of a method for determining whether to assign/use a band-edge channel, in accordance with one embodiment of the invention. In particular, FIG. 3 depicts a method for performing block 202 shown in FIG. 2, in accordance with one embodiment of the invention.

In accordance with the implementation shown, at block 302, a level of communication performance associated with the communication device is determined by a base station, the communication device, and/or another device.

The performance level, in one embodiment, is based on an indication of signal quality, for example, as may be provided by direct measurements. For example, in one embodiment, the base station measures the received signal quality of an uplink signal transmitted by a communication device. Similarly, in one embodiment, the communication device measures the received signal quality of a downlink signal transmitted by the base station. Both methods may also be employed in conjunction. In either case, the measure of signal quality may be based on determining one or a combination of known metrics for measuring the communication performance or "signal quality," including but not limited to, signal-to-noise ratio (SNR), signal-to-interference and noise ratio (SINR), received signal strength indication (RSSI), or some other signal quality metric. Such performance indication may also or alternatively be based on an indication of error, such as bit error rate (BER), frame error rate (FER), probability of error, or some other indication of error. A combination of signal quality and error measurements and/or other performance measurements may be utilized to determine a level of communication performance between the communication device and another device, such as a base station or another communication device.

At block 304, it is determined whether the level of communication performance determined at block 302 is above a threshold. In one embodiment, the threshold is selected (and may be adaptively adjusted during system operation) to indicate a relatively satisfactory performance. In one embodiment, the threshold is set relatively high, such that the threshold will only be exceeded when communication performance is relatively high, and transmission power to and/or from the communication device can be lowered substantially. For example, such situations may occur in some instances where the communication device and a device in communication therewith experience relatively little fading, interference, multipath, etc. For example, the communication device and the device in communication therewith may be in close proximity and/or experience line-of-sight (LOS).

In one embodiment, the threshold is selected such that it will only be exceeded if there is a likelihood that the communication device may transmit (and/or be transmitted to) at a power level consistent with the out-of-band transmission limits and the proximity of the terminal's channel to the band edge. It will be appreciated to those skilled in the art that the value of the threshold and the amount of surplus will depend on particular system design constraints, and will therefore vary among various embodiments of the invention.

At block 304, if it is determined that the performance level exceeds the threshold, then at block 204, one or more band-edge channels are assigned to the communication device.

However, if at block 304 it is determined that the performance level is below the threshold, then at block 306, the communication device is assigned an in-band channel for transmitting signals and/or for transmission of signals to it by another device (e.g., a base station or other terminal). In one embodiment, transmissions using in-band channel(s) can utilize up to the maximum transmission power level allowed by the system for in-band transmissions.

Figure 4:
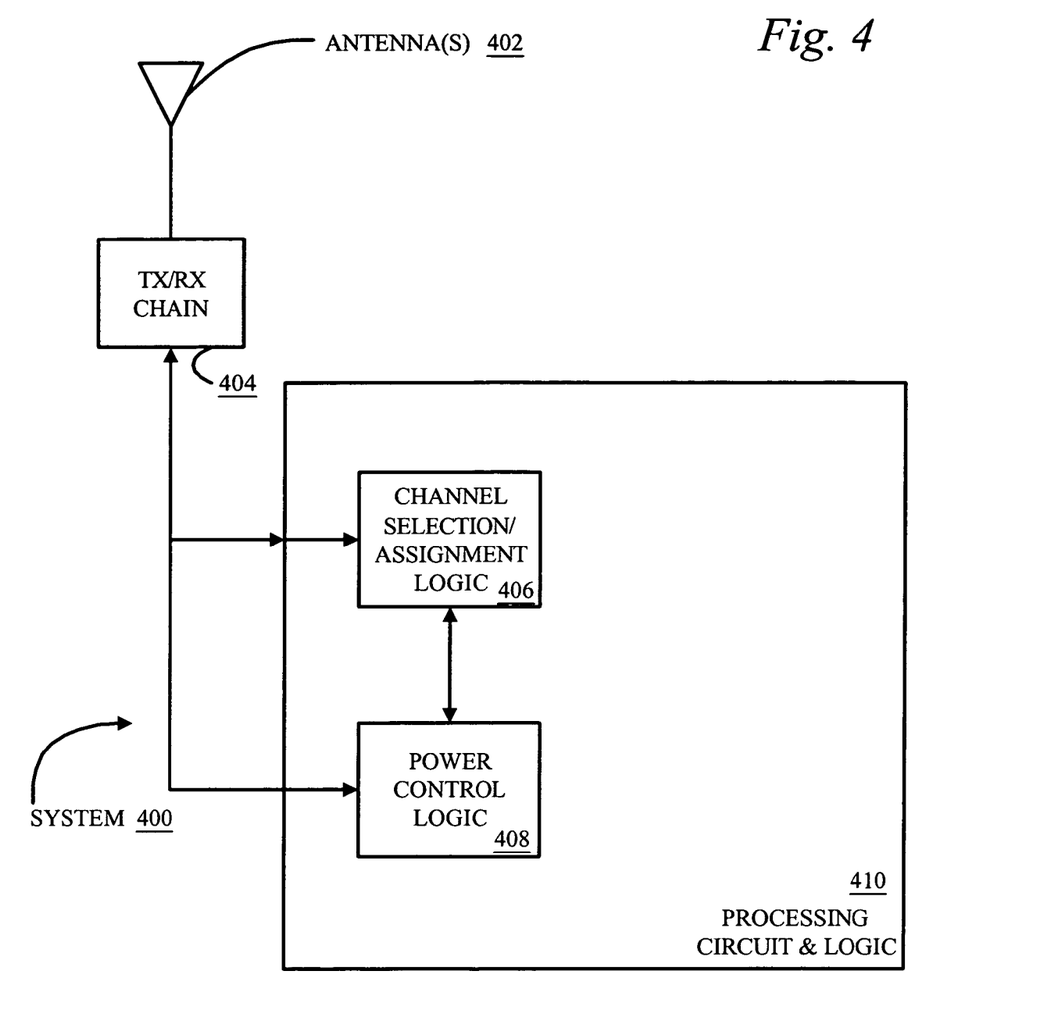
FIG. 4 is a block diagram of a communication device that provides a mechanism for utilizing band-edge channels for reduced power transmissions, in accordance with one embodiment of the invention.

FIG. 4 is a block diagram of a communication device that provides a mechanism for utilizing band-edge channels for reduced power transmissions, in accordance with one embodiment of the invention. In one embodiment, the system 400 shown in FIG. 4 is implemented in a base station. In another embodiment, the system 400 may be implemented in whole or part in a terminal unit, for example, as utilized in a peer-to-peer system. In yet another embodiment, channel assignment and/or power control logic may be implemented in whole or part on one or both devices that exchange signals with one another. To avoid obscuring the description of the invention, FIG. 4 does not depict all of the typical, well-known components of a base station or terminal device.

As shown, the system 400 includes at least one antenna 402, which is coupled to transmission (Tx) and reception (Rx) chains 404. Each of the Tx and Rx chains, collectively shown as element 404, may include various known elements (not shown) for providing wireless communication, such as amplifiers, local oscillators, filters, modulators/demodulators, analog-to-digital converters (ADC) or digital-to-analog converters (DACs), etc. Furthermore, in one embodiment of the invention, the antenna 402 represents an antenna array, and the system 400 provides adaptive array processing based on spatial characteristics of signals received at each element of the antenna array.

The chains 404 are coupled to a processing circuit and logic ("processor") 410. The processor 410 represents analog and digital hardware and associated software for performing various types (e.g., RF, IF and/or baseband) processing of signals received or transmitted by the system 400. As such, the processor 410 may include one or more processors, storage areas (e.g., read-only, random access, or other types of memory medium or devices), analog circuitry, etc. Such storage areas may store data, such as indications of performance associated with one or more communication devices, channel availability or assignment information, etc., as well as machine-executable instructions or routines for performing the acts described herein with reference to exemplary embodiments of the invention.

The processor 410 in one embodiment represents a baseband processor that includes circuitry for performing digital processing of signals. Accordingly, the processor, in one embodiment, includes one or more digital processing units that can provide various functionality, such as digital filtering, demodulation, error detection/correction, etc. In one embodiment, the processor 410 also includes a spatial processing unit that allows adaptive spatial processing of signals transmitted and/or received by the system 400, such that interference caused by transmissions of another device and/or interference experienced by the other device due to transmissions of the system 400 may be mitigated based on determining spatial characteristics, such as weights or signatures, of various devices and interferers.

As shown, the processor 410 includes a channel selection/assignment logic unit 406 and a power control logic unit 408. The channel selection/assignment logic unit 406 determines one or more channels to utilize based on various criteria, including, but not limited to, channel availability/system congestion, protocol criteria (e.g., phases of communication, such as idle, traffic, etc.), and in accordance with one embodiment of the invention, an indication of performance. Performance, as described in detail above, may be based on various criteria, such as measured signal quality, measured error, and/or stored information about a particular user, and/or another indication of quality. In accordance with one embodiment of the invention, indications of performance—which may be measured, stored, or received by the logic 406—are used as a basis for determining whether or not to assign a communication device to a band-edge channel.

In one embodiment, the channel selection/assignment logic unit 406 is implemented in a base station that serves a number of remote terminals in a certain band. In this embodiment, the channel selection/assignment logic unit, based on indications of performance that exceed a threshold for one or more communication devices, assigns one or more band-edge channels to those remote terminals. The indication of performance may be based on the base station measuring, for example, the signal quality and/or error of (uplink) signals received at the base station from the terminal unit(s) and/or the terminal unit(s) measuring, for example, the signal quality and/or error of (downlink) signals received at the terminal(s) unit from the base station. In the latter case, the terminal unit(s) may report the measured performance or an indication thereof to the system 400, based upon which measured performance/indication the channel selection/assignment logic assigns to the terminal unit(s) to at least one band-edge channel if performance is relatively high.

In an alternative embodiment, the system 400 is implemented as a communication device in a peer-to-peer network. In this embodiment, the system 400 is a mobile or stationary terminal unit in communication with another mobile or stationary terminal unit which may or may not also include the mechanism of the system 400 for assigning band-edge channels, for example, based upon an indication of performance. In this embodiment, the system 400, based on its performance and/or the performance of another device (and/or some other criteria), determines whether to utilize a band-edge channel for communication.

The power control logic 408 is coupled to the channel selection/assignment logic 406 to control transmission power of signals on one or more channels and by one or more devices, which may include the system 400 and/or a terminal unit in communication therewith. For example, in one embodiment, the power control logic 408 controls the channel selection/assignment logic 406 to cause signals to be transmitted at a relatively reduced power level in band-edge channels. In one embodiment, a first reduced power level may be utilized for transmissions by the system 400 in a band-edge channel and a second reduced power level may be utilized for transmissions by a terminal unit in communication with the system 400 that utilizes a band-edge channel.

It should be appreciated that each of the elements depicted in the Figures and described above may be implemented in hardware, software, or a combination thereof. It should be appreciated that the invention may be employed exclusively in software, in one embodiment, to include a software module for determining communication performance and a software module for assigning channels (including band-edge channels) and performing power control. Such software modules may be stored in a data storage medium accessible by execution circuitry, such as general purpose or digital signal processing (DSP) or other data processing device/circuitry such as an application-specific integrated circuit (ASIC), field-programmable gate array (FPGA), or other processing circuitry and/or software.

The hardware and/or software for implementing the invention may be included, for example, as a portion of a baseband processing unit of a base station and/or a terminal unit. As described above, either a base station or a terminal unit may include the hardware and/or software for performing one or more of the methods of the invention as described and claimed herein. Furthermore, in one embodiment, both devices (a base station and a terminal unit, or two terminal units or two base stations in the case of a peer-to-peer implementation) may include hardware and/or software for allowing cooperative assignment of band-edge channels and/or power control with respect to transmissions therein.

Although the invention has been described with reference to several embodiments, it will be appreciated that various alterations and modifications may be possible without departing from the spirit and scope of the invention, which is best understood by the claims that follow.

What is claimed is:

1. In a communication system having a first predefined maximum system transmission power level for in-band transmissions, a method in a first communication device comprising:
   determining that communication performance between the first communication device and a second communication device exceeds a performance threshold;
   based on the determination, assigning a first communication channel in a guard band for communication between the first communication device and the second communication device; and
   the first communication device transmitting a first signal for reception by the second communication device via the first communication channel in the guard band, the first signal transmitted at a reduced power level that is below the first predefined maximum system transmission power level.

2. The method of claim 1, further comprising:
   receiving at the first communication device, a second signal transmitted by the second communication device, the second signal transmitted at or below the reduced power level.

3. The method of claim 2, wherein the second signal is received via the first communication channel in the guard band.

4. The method of claim 2, wherein the second signal is received via a second communication channel in a guard band.

5. The method of claim 2, further comprising:
transmitting at the first communication device, an indication to the second communication device indicating a maximum transmission power level to be used by the second communication device.

6. The method of claim 2, further comprising:
using a power control mechanism to assign a temporary assigned power level for transmitting the second signal, the temporary assigned power level being less than the reduced power level.

7. The method of claim 6 further comprising:
determining a minimum level of communication performance for transmitting the second signal; and
selecting, based on determining the minimum level of communication performance, the temporary assigned power level.

8. The method of claim 2, further comprising:
after receiving the second signal, determining that interference affecting communication between the first and second communication devices is above a threshold; and
communicating that an amount of power used to transmit from the second communication device to the first communication device is to be increased.

9. The method of claim 1, further comprising:
using a power control mechanism to assign a temporary assigned power level for transmitting the first signal, the temporary assigned power level being less than the reduced power level.

10. The method of claim 6 further comprising:
determining a minimum level of communication performance for transmitting the first signal; and
selecting, based on determining the minimum level of communication performance, the temporary assigned power level.

11. The method of claim 10, wherein the communication performance is determined based on a metric selected from a group consisting of signal-to-noise ratio (SNR), signal-to-interference-noise ratio (SINR), received signal strength indication (RSSI), bit error rate (BER), and frame error rate (FER).

12. The method of claim 1, wherein the communication performance is determined based on a metric selected from a group consisting of signal-to-noise ratio (SNR), signal-to-interference-noise ratio (SINR), received signal strength indication (RSSI), bit error rate (BER), and frame error rate (FER).

13. The method of claim 1, further comprising:
after transmitting the first signal, determining that interference affecting communication between the first and second communication devices is above a threshold; and
increasing an amount of power used to transmit from the first communication device to the second communication device.

14. The method of claim 1 further comprising:
accessing the first predefined maximum system transmission power level for in-band transmissions from the first communication device to the second communication device;
accessing a second predefined maximum system transmission power level for in-band transmissions from the second communication device to the first communication device; and
causing the second communication device to transmit below the second predefined maximum system transmission power level.

15. The method of claim 14, wherein the first communication device comprises a base station and the second communication device comprises a terminal.

16. The method of claim 14, wherein the first and second predefined maximum system transmission power levels are equal.

17. The method of claim 14, wherein the first and second predefined maximum system transmission power levels are unequal.

18. In a communication system, a method comprising:
a first set of one or more communication channels for in-band transmissions;
assigning a second set of one or more communication channels for in-band transmissions, the second set of communication channels closer to a band edge than the first set of communication channels and the second set of communication channels in a guard band; and
transmitting within the second set of communication channels at a first power level that is less than a second power level used for transmitting within the first set of communication channels.

19. The method of claim 18, further comprising:
determining that communication performance of a first communication device exceeds that of a second communication device; and
based on the determination, assigning the first communication device to the second set of communication channels; and
assigning the second communication device to the first set of communication channels.

20. A first communication device comprising:
a processor to determine that communication performance between the first communication device and a second communication device exceeds a performance threshold, and to assign a communication channel in a guard band for communication between the first communication device and the second communication device based on the determination; and
at least one receive chain to receive a signal from the second communication device via the communication channel in the guard band, wherein the signal was transmitted by the second communication device at a reduced power level that is below a predefined maximum system transmission power level.

21. The first communication device of claim 20, wherein the processor is to determine the reduced power level, and wherein the first communication device comprises a transmit chain to transmit the determined reduced power level to the second communication device.

22. The first communication device of claim 20, wherein the processor is to determine the communication performance based at least in part on one of signal-to-noise ratio (SNR), signal-to-interference-noise ratio (SINR), received signal strength indication (RSSI), bit error rate (BER), and frame error rate (FER).

23. A first communication device comprising:
transmission and reception chains, the transmission chain to transmit a first signal to a second communication device, the reception chain to receive an assignment of a communication channel in a guard band that has been assigned based on a determination that communication performance between the first communication device and the second communication device exceeds a performance threshold, and the transmission chain to transmit a second signal to the second communication device via the communication channel in the guard band, wherein the second signal is transmitted at a reduced power level that is less than a maximum system transmission power level; and a processor coupled to the transmission and reception chains to process the first and second signals.

24. The first communication device of claim 23, wherein the transmission chain is to receive an indication of the reduced power level from the second communication device.

25. The first communication device of claim 23, wherein the first communication device comprises a terminal unit.

* * * * *